(12) United States Patent
Justin

(10) Patent No.: US 6,606,881 B1
(45) Date of Patent: Aug. 19, 2003

(54) ABSORPTION SOLUTION CONDITIONER

(75) Inventor: Dennis L. Justin, La Crosse, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 10/152,659

(22) Filed: May 20, 2002

(51) Int. Cl.$^7$ .............................................. F25B 43/04
(52) U.S. Cl. .......................... 62/475; 62/476; 62/495; 62/483; 62/485; 62/486
(58) Field of Search ........................ 62/476, 495, 483, 62/465, 486, 475

(56) References Cited

U.S. PATENT DOCUMENTS

| | | | | |
|---|---|---|---|---|
| 5,002,650 A | * | 3/1991 | Beaupre | 204/237 |
| 5,237,839 A | * | 8/1993 | Dehne | 62/476 |
| 5,253,523 A | * | 10/1993 | Bernardin | 62/476 |
| 6,033,635 A | * | 3/2000 | Gammill | 422/245.1 |
| 6,322,675 B1 | * | 11/2001 | Pratt | 204/239 |

* cited by examiner

*Primary Examiner*—Denise L. Esquivel
*Assistant Examiner*—Mark Shulman
(74) *Attorney, Agent, or Firm*—William J. Beres; William O'Driscoll

(57) ABSTRACT

A filter system for an absorption chiller includes a replaceable filter element, a plateable member, and a sacrificial member. The filter receives a weak solution from the chiller's evaporator, receives a stronger solution from the chiller's absorber, and discharges a mixture of the solutions to the chiller's generator. Conveying the weak solution to the filter system avoids creating an accumulation of lithium bromide in the evaporator and helps dissolve or flush inhibitors from the filter element on a continuous basis. Combining the weak and stronger solutions in the filter system attempts to confine a corrosion or copper oxide plating process to an area of the chiller that can be readily serviced. The plateable member and the sacrificial member provide replaceable or consumable members used in the corrosion or plating process.

35 Claims, 1 Drawing Sheet

ABSORPTION SOLUTION CONDITIONER

BACKGROUND OF THE INVENTION

1. Field of the Invention

The present invention relates to absorption chillers and more specifically to a system that conditions an absorption solution by removing from the solution certain contaminants, such as copper oxide.

2. Description of Related Art

Absorption chillers provide chilled water using a thermal-chemical process. Such a process typically involves cyclically vaporizing a refrigerant from an absorbent solution, expanding the refrigerant to create a cooling effect, and then reabsorbing the refrigerant back into the solution to perpetuate the cycle. Various refrigerant/absorbent solutions are known; however, water as the refrigerant and lithium bromide as the absorbent is one of the more common solutions.

Unfortunately, lithium bromide is a salt that under certain conditions can promote corrosion of iron and copper inside the chiller. In some cases, corrosion can weaken the hermetic integrity of the chiller, reduce heat transfer efficiencies, restrict solution flow, plug solution filters, interfere with pump operation, and obstruct movement of certain chiller components.

To avoid or minimize these problems, many chiller components are made of corrosion resistant materials. For example, heat exchanger tubes can be made of cupronickel, and the shell or other components can be made of various iron alloys, such as steel or even stainless steel where necessary.

Adding a chemical inhibitor to the solution can also reduce corrosion. Common inhibitors include lithium molybdates (e.g., lithium molybdate), nitrates (e.g., lithium nitrate), chromates (e.g., lithium chromate), and arsenite. However, even with corrosion resistant materials and rust inhibitors, some corrosion may still occur, especially when air leaks into the chiller.

Corrosion can create iron oxide and copper oxide that can become dispersed into the solution. The solution can be forced through a filter to remove the oxides; however, if the filters are not serviced regularly, the filter can become plugged with oxides. A buildup of oxides in the filter can reduce the filter's porosity to a point where the inhibitors start becoming trapped in the filter. A filter that removes inhibitors from the solution can reduces a chiller's ability to resist further corrosion.

SUMMARY OF THE INVENTION

It is an object of the present invention to remove copper oxide from an absorption solution by promoting a copper oxide plating process within a filter housing or within some other serviceable housing of an absorption chiller.

Another object is to feed the serviceable housing via a solution line that includes a flow restriction. The flow restriction allows the solution line to convey a relatively slow, continuous flow of solution from the chiller's evaporator to help prevent the same solution from becoming too concentrated with lithium bromide.

Another object is to use a steady flow of solution from the chiller's evaporator to help dissolve (on a generally continuous basis) a rust inhibitor from the chiller's solution filter. The inhibitor may include, but is not limited to, molybdate, nitrate, arsenite, and chromate.

Yet, another object is to provide an absorption chiller with a sacrificial iron member that protects other components of the chiller during a copper oxide plating process.

A further object is to provide a filter for an absorption chiller with a plateable member upon which copper oxide may become plated.

One or more of these and other objects of the invention are provided by a filter system for an absorption chiller. To remove contaminants from the solution, the system includes a filter element disposed within a serviceable filter housing. A refrigerant or weak solution from the chiller's evaporator and a stronger solution from the chiller's absorber are conveyed to the filter housing on a generally continuous basis. The purpose is to avoid accumulating lithium bromide in the evaporator and to remove copper oxide from the solution by promoting a copper oxide plating process within the filter housing. The filter system is preferably provided with a plateable member and a sacrificial iron member.

The present invention provides a filter system for filtering contaminants from an absorption apparatus. The absorption apparatus circulates a solution whose concentration varies from being a weak solution at a first point, a stronger solution at a second point, and an intermediate solution at a third point. The filter system comprises a filter housing defining a filter inlet and a filter outlet; a first inlet line coupling the filter inlet to the first point to convey the weak solution to the filter housing; and a second inlet line coupling the filter inlet to the second point to convey the stronger solution to the filter housing, whereby the weak solution mixes with the stronger solution to produce the intermediate solution. The filter system also comprises a filter element disposed inside the filter housing, wherein the filter element has a porosity that is sufficiently fine to filter the contaminants from the intermediate solution upon the intermediate solution passing through the filter element. The filter system further comprises a discharge line connecting the filter outlet to the third point to convey the intermediate solution from the filter housing to the third point; and a flow restriction disposed in the first inlet line to ensure that solution flow through the first inlet line is less than solution flow through the second inlet line.

The present invention also provides an absorption apparatus that circulates a solution with a contaminant that includes copper oxide. The solution has a varying degree of concentration of lithium bromide in water. The absorption apparatus comprises a generator that vaporizes the water from the solution to produce a water vapor and a stronger solution; a condenser in fluid communication with the generator where the condenser condenses the water vapor to create a weak solution; an evaporator in fluid communication with the condenser where the evaporator receives the weak solution from the condenser and vaporizes the weak solution thereby recreating the water vapor; and an absorber in fluid communication with the evaporator and the generator. The absorber receives the water vapor from the evaporator, receives the stronger solution from the generator, and promotes the absorption of the water vapor into the stronger solution to create a first intermediate solution. The absorption apparatus also comprises a filter housing defining a filter inlet and a filter outlet; a first inlet line coupling the filter inlet to the evaporator such that the first inlet line conveys the weak solution from the evaporator to the filter inlet; and a second inlet line coupling the filter inlet to the absorber such that the second inlet line conveys the first intermediate solution from the absorber to the filter inlet. The weak solution mixes with the first intermediate solution to produce a second intermediate solution having a lower concentration than the first intermediate solution. The absorption apparatus further comprises a filter element disposed inside the filter housing wherein the filter element has a porosity that is sufficiently fine to filter the contaminant from the solution upon the second intermediate solution passing through the filter element; a discharge line coupling the filter outlet to the generator to convey the second intermediate solution from the filter housing eventually back to the generator; and a plateable member disposed inside the filter housing wherein the copper oxide becomes plated onto the plateable member.

The present invention further provides a method of conditioning a solution of an absorption apparatus. The absorption apparatus includes a generator, a condenser, an evaporator and an absorber, wherein the solution has a varying concentration of lithium bromide in water and includes a contaminant of copper oxide. The method comprises providing a plateable member within a housing; circulating the solution through the housing; plating the copper oxide on the plateable member; and using at least one valve to periodically isolate the housing from the generator, the condenser, the evaporator and the absorber to facilitate the servicing of the plateable member.

The present invention additionally provides apparatus for conditioning a solution of an absorption apparatus wherein the solution has a varying concentration of lithium bromide in water and includes a contaminant of copper oxide. The apparatus comprises a generator; a condenser; an evaporator; an absorber; a plateable member within a housing; a device circulating the solution through the housing; operable elements plating the copper oxide on the plateable member; and at least one valve to periodically isolate the housing from the generator, the condenser, the evaporator and the absorber to facilitate the servicing of the plateable member.

DESCRIPTION OF THE PREFERRED EMBODIMENT

Figure 1:
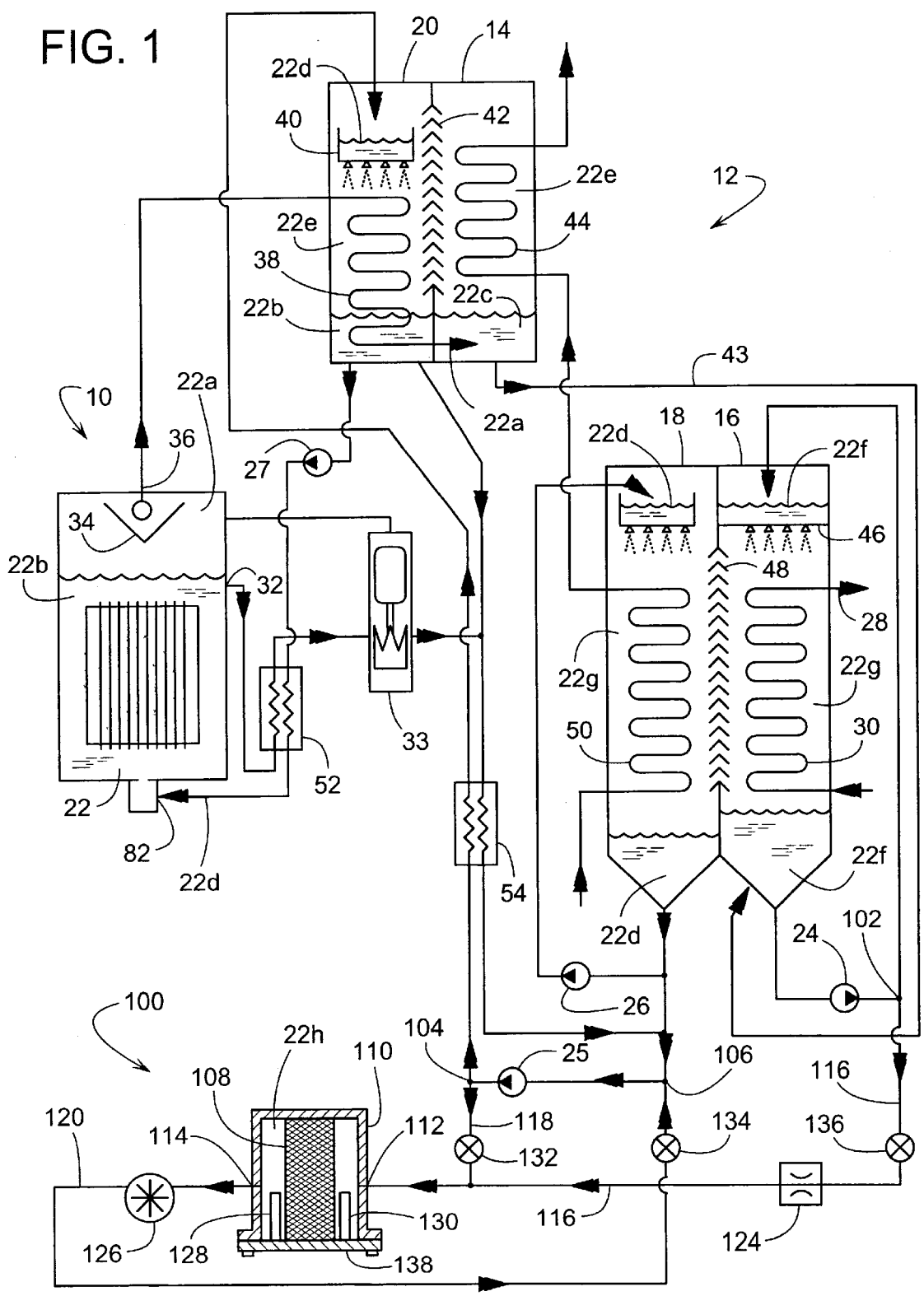
FIG. 1 is a schematic diagram of an absorption chiller that includes filter system according to one embodiment of the invention.

Referring to FIG. 1, an absorption chiller 12 includes a filter system 100 for filtering contaminants from the chiller's absorption solution 22. Solution 22 is any solution having at least one constituent that can be separated from and reabsorbed into a second constituent. The invention will be described with reference to solution 22 consisting of water and lithium bromide; however, other solutions, may also be within the scope of the invention. Throughout chiller 12, the concentration of solution 22 may range from a weak to a strong solution, with a weak solution being pure or nearly pure water. Terms such as, "weak," "intermediate," "strong," and "stronger," describe a solution's relative strength or concentration of lithium bromide rather than defining a particular concentration. Also, the phase of solution 22 can vary from a liquid state to a vaporous or gaseous state.

It should be appreciated by those skilled in the art that chiller 12 is just one example of an absorption chiller, and that filter system 100 could be readily applied to a variety of other absorption chillers as well. To provide some background information, filter system 100 will be described by first providing an overview of chiller 12.

In this particular example, major components of chiller 12 include a high temperature generator 10, a condenser 14, an evaporator 16, an absorber 18 and a low temperature generator 20. Solution pumps 24, 25, 26 and 27 circulate solution 22 through the various components of chiller 12 for the main purpose of providing chilled water 28. Water 28 is chilled upon passing through a heat exchanger 30 disposed in evaporator 16. Chilled water 28, which can actually be pure water, glycol, a mixture of water and glycol, or various other fluids, can be conveyed to wherever chilled water 28 is needed. For example, chilled water 28 can be circulated through another heat exchanger (not shown) for cooling a room or other areas within a building.

To provide chilled water 28, the various components of chiller 12 act upon solution 22 in various ways. Generator 10 vaporizes solution 22 to create a lower concentrated solution vapor 22a (primarily water) and a higher concentrated solution 22b (liquid water with a high concentration of lithium bromide). Concentrated solution 22b exits generator 10 through a liquid solution outlet 32. To maintain a proper level of liquid solution 22b in generator 10, a conventional float valve 33 regulates the amount of solution that can exit outlet 32. Meanwhile, solution vapor 22a passes through a vapor separator 34 before exiting through a vapor outlet 36.

From outlet 36, vapor 22a passes through a heat exchanger 38 in low temperature generator 20 and discharges to mix with a weak liquid solution 22c at the bottom of condenser 14. A reservoir 40 in generator 20 directs a liquid solution 22d of intermediate concentration to pass across heat exchanger 38. The heat from solution 22a in heat exchanger 38 vaporizes solution 22d to create a weak vapor solution 22e and a strong liquid solution 22b. Strong solution 22b collects at the bottom of generator 20, and vapor 22e migrates through a vapor separator 42 to enter condenser 14. A heat exchanger 44 conveying water typically cooled by a conventional cooling tower condenses vapor 22e, which then collects at the bottom of condenser 14 to mix with weak solution 22a to create weak solution 22c.

Weak solution 22c, whose pressure is raised by heating in generators 10 and 20, is conveyed by line 43 to lower pressure evaporator 16. As weak solution 22c expands due to the lower pressure in evaporator 16, the temperature of solution 22c drops significantly to create a weak solution 22f of a lower temperature and pressure. To cool chilled water 28, pump 24 circulates solution 22f through evaporator 16, as a reservoir 46 directs solution 22f across heat exchanger 30.

As solution 22f absorbs heat from the water conveyed through heat exchanger 30, solution 22f vaporizes and migrates into absorber 18 through a vapor separator 48. Pump 26 circulates intermediate solution 22d across heat exchanger 50 and an atmosphere of vapor 22g, whereby solution 22d absorbs vapor 22g and collects at the bottom of absorber 18. Pump 25 pumps solution 22d to replenish the supply of intermediate solution in lower temperature generator 20. And pump 27 pumps solution 22b from generator 20 to generator 10 to replenish the supply of solution in generator 10. As solution 22b is conveyed to generator 10 and solution 22d is conveyed to generator 20, solution-to-solution heat exchangers 52 and 54 help preheat solution entering generators 10 and 20, by recovering the otherwise wasted heat from the solution leaving the generators.

To filter contaminants from solution 22 and to help control corrosion within chiller 12, filter system 100 is connected to chiller 12 at a first point 102, a second point 104, and a third point 106. Filter system 100 includes a filter element 108 inside a serviceable filter housing 110. The term, "serviceable" refers to item of an absorption chiller that can be accessed without having to completely lose the entire vacuum or pressure within the chiller. Housing 110 includes a filter inlet 112 and a filter outlet 114, such that solution passing from inlet 112 to outlet 114 is forced to pass through filter element 108. Filter element 108 is schematically illustrated to represent any element whose porosity is sufficient to catch contaminants of at least a predetermined size. Examples of filter element 108 include, but are not limited to, a fine mesh screen, a porous paper or fabric, a sintered metal block, etc. Filter element 108 can be supported within housing 110 in any conventional manner.

A first inlet line 116 connects filter inlet 112 to first point 102, a second inlet line 118 connects filter inlet 112 to second point 104, and a discharge line 120 connects filter outlet 114 to third point 106. In this arrangement, first inlet line 116 conveys weak solution 22f from a lower portion of evaporator 16 into filter inlet 112 to mix with stronger solution from line 118. This creates an intermediate solution 22h comprising a mixture of solutions 22d and 22f that element 108 filters and discharge line 120 conveys to point 106. At point 106, intermediate solution 22h mixes with solution 22d from absorber 18 and 22b from generator 20, and a portion of the resulting mixture is returned to filter housing 110 via second inlet line 118. It should be noted that the concentration of solution 22d may vary depending on where in chiller 12 solution 22d resides, e.g., in generator 20, absorber 18, or elsewhere.

Conveying weak solution 22f from evaporator 16 into filter housing 110 is intended to accomplish several objectives. First, it avoids creating an accumulation of lithium bromide in evaporator 18; second, it helps dissolve or flush inhibitors from filter element 108; and third, it attempts to confine corrosion/plating to an area of chiller 12 that can be readily serviced.

Regarding the first objective, most of the solution (i.e., water) in evaporator 16 exits the evaporator by vaporizing in evaporator 16 and then passing through vapor separator 48 to be absorbed in absorber 18. Since the lithium bromide does not evaporate, evaporator 16 can be left with an ever-increasing concentration of lithium bromide. So, line 116 continuously bleeds a percentage of solution 22f from evaporator 16 to ensure that lithium bromide does not remain trapped there. So as not to completely drain evaporator 16 of solution, a flow restrictor 124 (e.g., an orifice, capillary, valve, etc.) can be added to inlet line 116. Flow restrictor 124 preferably limits the flow rate in line 116 to less than the flow rate through inlet line 118. Also, a flow indicator 126 can be added to discharge line 120 to provide a visual indication that filter element 108 is not plugged.

As for the second objective, solution 22f has a relatively low concentration of lithium bromide, so it is able to take on more inhibitor than a solution of higher concentration (e.g., solution passing through inlet line 118). Continuously feeding solution 22f through inlet line 116 into filter inlet 112 helps prevent inhibitor from accumulating in filter element 108. Once the inhibitor is flushed from filter element 108, outlet line 120 can return the inhibitor back to point 106 where the inhibitor can once again circulate through chiller 12. Examples of inhibitors include, but are not limited to, lithium molybdates (e.g., lithium molybdate), nitrates (e.g., lithium nitrate), chromates (e.g., lithium chromate), and arsenite.

As for the third objective, the plating of copper oxide within chiller 12 is preferably contained in a non-critical serviceable area, such as inside filter housing 110. To this end, a plateable member 128 and a sacrificial iron member 130 are installed inside filter housing 110. Plateable member 128 is schematically illustrated to represent any member upon which copper oxide may become plated. The material, location, and structure of member 128 may vary; however, in some cases member 128 is block or stainless steel screen that is adjacent or surrounding filter element 108. Sacrificial iron member 130 is schematically illustrated to represent any member that chemically erodes during the plating process. The material, location, and structure of member 130 may vary; however, in some cases member 130 is steel block or screen that is adjacent or surrounding filter element 108 and/or member 128. Closing valves 132, 134 and 136 and removing a cover 138 from filter housing 110 allows the replacement or servicing of filter element 108, plateable member 128 and sacrificial iron member 130.

Although the invention is described with reference to a preferred embodiment, it should be appreciated by those skilled in the art that other variations are well within the scope of the invention. For example, the various components of chiller 12 can be rearranged in a variety of configurations. The shells of generator 10, low temperature generator 20, condenser 14, absorber 18, and evaporator 16 can be individual shells interconnected by piping, or various combinations of shells may share a common shell wall. Therefore, the scope of the invention is to be determined by reference to the claims, which follow.

I claim:

1. A filter system for filtering contaminants from an absorption apparatus, wherein the absorption apparatus circulates a solution whose concentration varies from being a weak solution at a first point, a stronger solution at a second point, and an intermediate solution at a third point, the filter system comprising:

a filter housing defining a filter inlet and a filter outlet;

a first inlet line coupling the filter inlet to the first point to convey the weak solution to the filter housing;

a second inlet line coupling the filter inlet to the second point to convey the stronger solution to the filter housing, whereby the weak solution mixes with the stronger solution to produce the intermediate solution;

a filter element disposed inside the filter housing, wherein the filter element has a porosity that is sufficiently fine to filter the contaminants from the intermediate solution upon the intermediate solution passing through the filter element;

a discharge line connecting the filter outlet to the third point to convey the intermediate solution from the filter housing to the third point; and a flow restriction disposed in the first inlet line to ensure that solution flow through the first inlet line is less than solution flow through the second inlet line.

2. The filter system of claim 1, wherein the flow restriction provides a substantially fixed restriction to flow therethrough.

3. The filter system of claim 1, wherein the contaminants include copper oxide.

4. The filter system of claim 3, further comprising a plateable member disposed inside the filter housing, wherein the copper oxide becomes plated onto the plateable member.

5. The filter system of claim 4, wherein the plateable member includes stainless steel.

6. The filter system of claim 4, further comprising a sacrificial iron member disposed inside the filter housing, wherein the sacrificial iron member promotes plating of the plateable member.

7. The filter system of claim 1, wherein the third point is at a higher temperature than the first point.

8. The filter system of claim 1, wherein the weak solution, the stronger solution and the intermediate solution include lithium bromide and water.

9. The filter system of claim 1, wherein the stronger solution includes a rust inhibitor.

10. The filter system of claim 9, wherein the rust inhibitor includes lithium molybdate.

11. The filter system of claim 9, wherein the rust inhibitor includes lithium nitrate.

12. The filter system of claim 9, wherein the rust inhibitor includes arsenite.

13. The filter system of claim 9, wherein the rust inhibitor includes chromates.

14. An absorption apparatus that circulates a solution with a contaminant that includes copper oxide, wherein the solution has a varying degree of concentration of lithium bromide in water, the absorption apparatus comprising:
   a generator that vaporizes the water from the solution to produce a water vapor and a stronger solution;
   a condenser in fluid communication with the generator, the condenser condenses the water vapor to create a weak solution;
   an evaporator in fluid communication with the condenser, the evaporator receives the weak solution from the condenser and vaporizes the weak solution, thereby recreating the water vapor;
   an absorber in fluid communication with the evaporator and the generator, the absorber receives the water vapor from the evaporator, receives the stronger solution from the generator, and promotes the absorption of the water vapor into the stronger solution to create a first intermediate solution;
   a filter housing defining a filter inlet and a filter outlet;
   a first inlet line coupling the filter inlet to the evaporator, such that the first inlet line conveys the weak solution from the evaporator to the filter inlet;
   a second inlet line coupling the filter inlet to the absorber, such that the second inlet line conveys the first intermediate solution from the absorber to the filter inlet, whereby the weak solution mixes with the first intermediate solution to produce a second intermediate solution having a lower concentration than the first intermediate solution;
   a filter element disposed inside the filter housing, wherein the filter element has a porosity that is sufficiently fine to filter the contaminant from the solution upon the second intermediate solution passing through the filter element;
   a discharge line coupling the filter outlet to the generator to convey the second intermediate solution from the filter housing eventually back to the generator; and
   a plateable member disposed inside the filter housing, wherein the copper oxide becomes plated onto the plateable member.

15. The filter system of claim 14, wherein the plateable member includes stainless steel.

16. The filter system of claim 14, further comprising a sacrificial iron member disposed inside the filter housing, wherein the sacrificial iron member promotes plating of the plateable member.

17. The absorption apparatus of claim 14, further comprising a flow restriction disposed in the first inlet line to ensure that solution flow through the first inlet line is less than solution flow through the second inlet line.

18. The filter system of claim 17, wherein the flow restriction provides a substantially fixed restriction to flow therethrough.

19. The absorption apparatus of claim 14, wherein the first intermediate solution is at a higher temperature than the second intermediate solution.

20. The absorption apparatus of claim 14, wherein the solution includes a rust inhibitor.

21. The absorption apparatus of claim 20, wherein the rust inhibitor includes lithium molybdate.

22. The absorption apparatus of claim 20, wherein the rust inhibitor includes lithium nitrate.

23. The absorption apparatus of claim 20, wherein the rust inhibitor includes arsenite.

24. The absorption apparatus of claim 20, wherein the rust inhibitor includes chromates.

25. A method of conditioning a solution of an absorption apparatus that includes a generator, a condenser, an evaporator and an absorber, wherein the solution has a varying concentration of lithium bromide in water and includes a contaminant of copper oxide, the method comprising:
   providing a plateable member within a housing;
   circulating the solution through the housing;
   plating the copper oxide on the plateable member; and
   using at least one valve to periodically isolate the housing from the generator, the condenser, the evaporator and the absorber to facilitate the servicing of the plateable member.

26. The method of claim 25, wherein the plateable member include stainless steel.

27. The method of claim 25, further comprising filtering the solution within the housing.

28. The method of claim 25, further comprising sacrificing an iron element within the housing to promote the plating of the copper oxide on the plateable member.

29. The method of claim 25, further comprising conveying the solution from the evaporator to the housing.

30. The method of claim 29, further comprising conveying the solution from the absorber to the housing.

31. The method of claim 30, further comprising conveying the solution from the housing to the generator.

32. Apparatus for conditioning a solution of an absorption apparatus wherein the solution has a varying concentration of lithium bromide in water and includes a contaminant of copper oxide, the apparatus comprising:
   a generator;
   a condenser;
   an evaporator;
   an absorber;
   a plateable member within a housing;
   means for circulating the solution through the housing;
   means for plating the copper oxide on the plateable member; and
   at least one valve to periodically isolate the housing from the generator, the condenser, the evaporator and the absorber to facilitate the servicing of the plateable member.

33. The apparatus of claim 32, further comprising means for filtering the solution within the housing.

34. The apparatus of claim 32, further comprising means for sacrificing an iron element within the housing to promote the plating of the copper oxide on the plateable member.

35. The apparatus of claim 32, further comprising means for conveying the solution from the evaporator to the housing, means for conveying the solution from the absorber to the housing, and means for conveying the solution from the housing to the generator.

* * * * *